United States Patent [19]

Goloff

[11] 4,047,772
[45] Sept. 13, 1977

[54] BEARING CONSTRUCTIONS
[75] Inventor: Alexander Goloff, East Peoria, Ill.
[73] Assignee: Caterpillar Tractor Co., Peoria, Ill.
[21] Appl. No.: 691,911
[22] Filed: June 1, 1976
[51] Int. Cl.² ............................................. F16C 27/00
[52] U.S. Cl. ............................... 308/237 R; 418/61 A
[58] Field of Search ................. 308/65, 237 R, 237 A, 308/238, 26, 184 R; 418/61 A

[56] References Cited
U.S. PATENT DOCUMENTS

| 3,171,699 | 3/1965 | Maxey | 308/26 |
| 3,276,676 | 10/1966 | Buske | 308/65 X |
| 3,515,449 | 6/1970 | Harbage | 308/238 |

Primary Examiner—Joseph F. Peters, Jr.
Assistant Examiner—Gene A. Church
Attorney, Agent, or Firm—Wegner, Stellman, McCord, Wiles & Wood

[57] ABSTRACT

An improved bearing construction for a mechanism including a shaft and a relatively rotatable member having an opening receiving the shaft with a cylindrical bearing carried by the member and journalling the shaft, the mechanism being of the type adapted to be loaded generally radially of the shaft. The improved bearing construction contemplates that the opening be elongated in a direction transverse to the direction of loading, that the exterior surface of the bearing is grooved to increase its elasticity, and that there be a thin layer of elastomer interposed between the bearing and the opening to compensate for distortion in the bearing due to dynamic loading.

6 Claims, 3 Drawing Figures

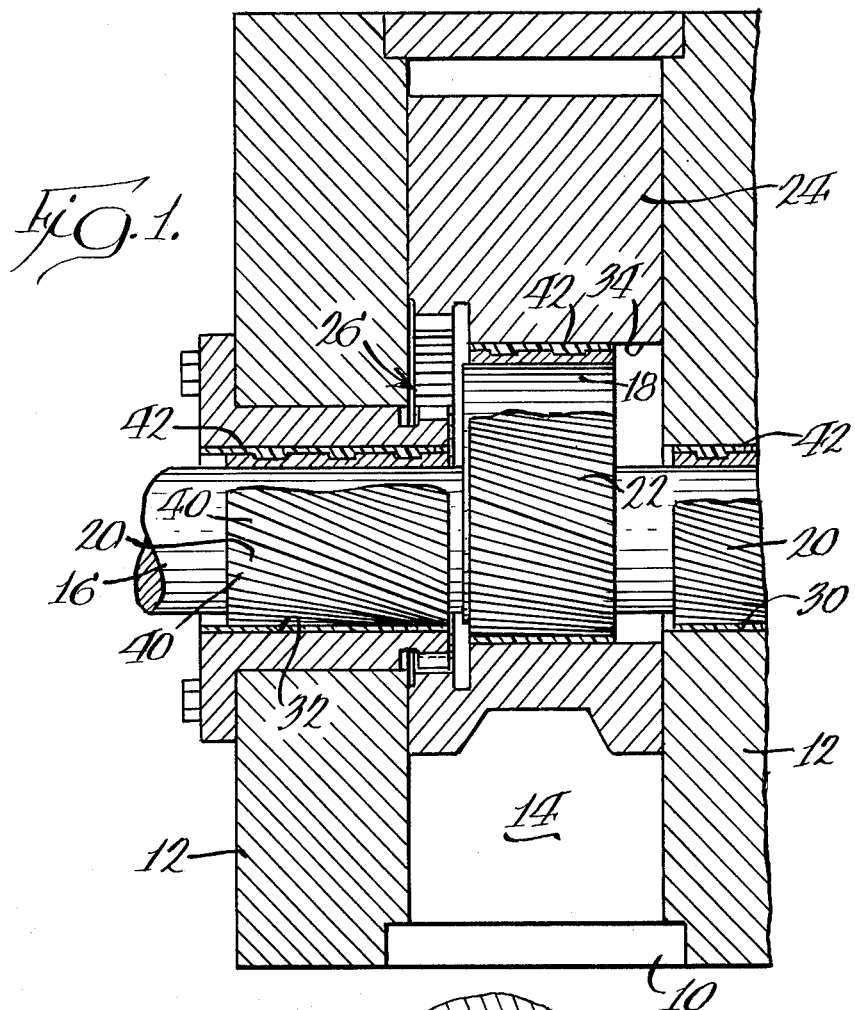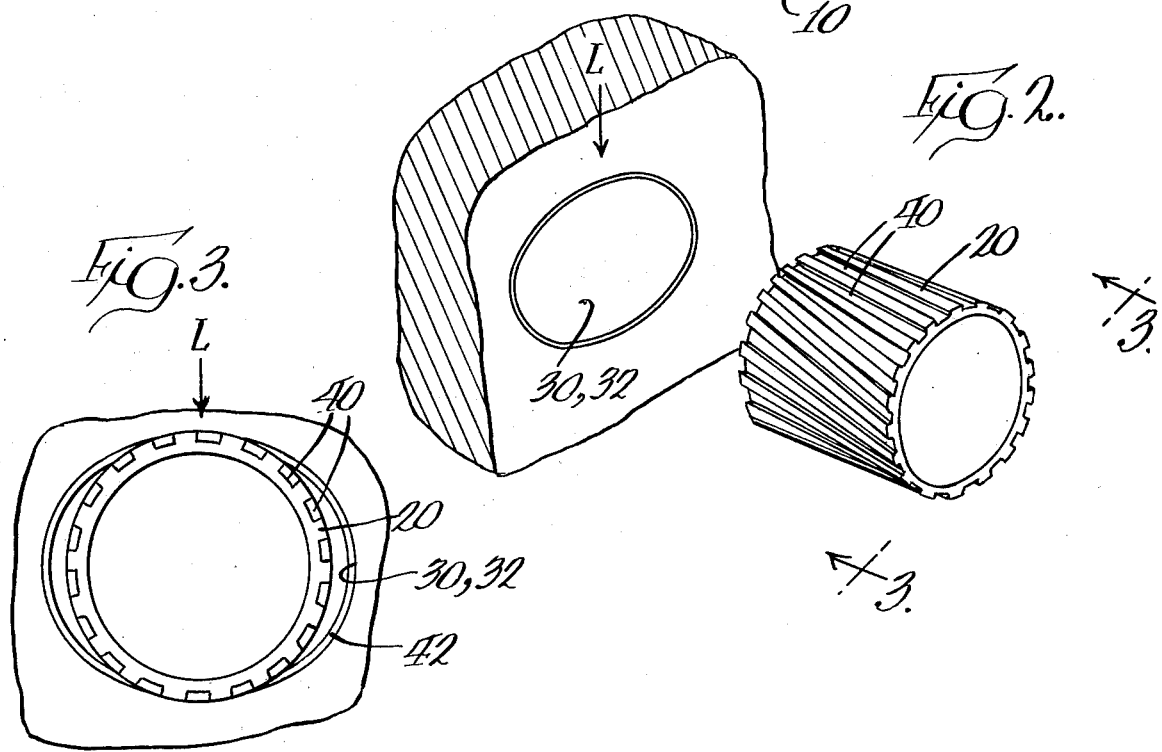

BEARING CONSTRUCTIONS

BACKGROUND OF THE INVENTION

This invention relates to improved bearing constructions. More specifically, it relates to improved bearing constructions, particularly suitable for use in structures encountering dynamic loading radially of the shaft.

Prior art of possible relevance includes U.S. Pat. Nos. 3,096,746 issued July 9, 1963 to Sollinger; and 3,276,676 issued Oct. 4, 1966 to Buske.

In mechanisms employing relatively rotatable members including a shaft, wherein loads are applied to the members radially of the shaft, the shape of bearing tends to distort due to dynamic loads with the result that the bearings lose their load carrying capacity. In some cases, the loss is sufficient as to cause a bearing seizure.

Typically, to overcome the problem, the bearings are made with variable wall thicknesses and have a maximum interior diameter along the parting line of the bearing, that is, in a direction generally transverse to the application of the load. The minimum internal diameter is approximately at 90° to the maximum internal diameter. The above identified Buske patent is exemplary of this approach.

Substantial difficulties may be encountered with bearings of the type proposed by Buske. For example, the same must be oriented properly during their initial installation or their load carrying capacity is actually reduced rather than increased by reason of the departure from a true circular configuration.

SUMMARY OF THE INVENTION

It is the principal object of the invention to provide a new and improved bearing structure. More specifically, it is an object of the invention to provide a bearing structure wherein load carrying capacity is maximized and initial installation problems are eliminated.

An exemplary embodiment of the invention achieves the foregoing object in a mechanism including a shaft, a relatively rotatable member having an opening receiving the shaft, and a cylindrical bearing carried by the member and journalling the shaft.

According to one embodiment of the invention, the improved bearing structure is obtained by elongating the bearing receiving opening in a direction transverse to the direction of loading at the time of fabrication and before installation of the bearing so that, upon installation of the bearing, a desired relation of maximum internal diameters will be obtained without any need for initial orientation of the bearing with respect to the rotatable member.

In another embodiment of the invention, the exterior surface of the bearing is grooved so that the bearing becomes somewhat elastic and can readily conform to the opening even when the latter distorts during operation, again, to achieve the desired relation of internal diameters.

In still another embodiment of the invention, a thin layer of elastomer is interposed between the bearing and the opening, also for the purpose of allowing the bearing to flex and conform to the opening when dynamically loaded.

In a highly preferred embodiment, two or more of the foregoing embodiments are combined in a single structure.

Other objects and advantages will become apparent from the following specification taken in connection with the accompanying drawings.

DESCRIPTION OF THE DRAWINGS

FIG. 1 is a sectional view of a mechanism, in particular, a trochoidal mechanism, embodying bearings made according to the invention;

FIG. 2 is an exploded view of a bearing and a relatively rotatable member receiving the bearing; and FIG. 3 is a view taken approximately along the line 3—3 of FIG. 2.

DESCRIPTION OF THE PREFERRED EMBODIMENTS

An exemplary embodiment of a bearing structure made according to the invention is illustrated in FIG. 1 in connection with a rotary mechanism, namely, a trochoidal mechanism, having a center housing 10 flanked by side housings 12 to define a chamber 14. A shaft 16 extends through the chamber and includes an eccentric 18 therein. The shaft 16 is journalled by bearings 20 made according to the invention in the end housings 12 and the eccentric 18 is journalled within a bearing 22 carried by a rotor 24 within the chamber 14. Timing gearing, generally designated 26, is also provided.

The bearings 20 are carried by the end housings 12, and specifically, in openings 30 and 32 therein, while bearing 22 is carried within an opening 34 in the rotor 24. As can be seen in FIGS. 2 and 3, the openings 30 and 32 are noncircular. In particular, they are generally elliptical and, are elongated in a direction transverse to the application of the loading thereto, which loading is designated by the arrow "L" in FIGS. 2 and 3. Those skilled in the art recognize that loading applied to the shaft 16 will be generally unidirectional in a trochoidal type mechanism.

While not shown herein, the opening 34 is also noncircular and, for a trochoidal type mechanism as described, will tend to approach a hexagonal shape with the maximum dimensions being transverse to the direction of loading applied thereto. Those skilled in the art will recognize that the rotor 24 is generally triangular and that the loading is applied at different times during the operating cycle to each of the three faces thereof. Thus, a plane encompassing opposite corners of the hexagonal opening 34 will parallel a corresponding one of the faces of the rotor to achieve the foregoing relationship.

In the case of both bearings 20 and 22, the bearing structure itself will be cylindrical with its outer periphery having a length approximately equal to the circumference of the opening in which it is to be received with an exception to be described in greater detail hereinafter. Thus, the bearing will be somewhat distorted when inserted into the opening in which it is to be received and initially will appear with respect to its opening as illustrated in FIG. 3.

Once installed, the bearings, whether they be the bearings 20 or 22, will assume a configuration closely approximating that of the opening in which they are received so that when the load is imposed during operation, the same will distort slightly to embrace the shaft 16 or the eccentric 18, as the case may be with a truly cylindrical interior surface to maximize load carrying capacity.

According to the invention, to enhance the ability of the bearing to distort under loading to achieve a truly cylindrical interior shape, the bearings are made more elastic by the provision of grooves 40 in the exterior surface thereof. The grooves 40 extend axially, or circumferentially, or in combinations thereof, as illustrated in the Figures.

To further enhance the ability of the bearings to distort so that their interior surfaces achieve a true cylindrical configuration, a thin layer 42 of an elastomer may be interposed between the exterior surface of the bearings and the openings in which they are received. Normally, the layer 42 will have a thickness on the order of but a few thousandths of an inch since, in general, only a distortion of the bearings on the order of one to two thousandths of an inch is required to obtain the benefits of the invention.

The invention specifically contemplates the use of noncircular openings with bearings that are neither externally grooved nor mounted in an elastomer. At the same time, the invention contemplates the use of externally grooved bearings in truly cylindrical openings with or without the use of an elastomer. In general, where the bearings are subject to heat during operation, the use of the elastomer is to be avoided by reason of its impeding heat transfer necessary to cool the bearings and maintain an oil film of sufficient thickness to preclude bearing damage. It is to be specifically understood, that the invention is applicable to bearings whether split or unitary and no restriction to one type or the other is intended.

From the foregoing, it will be appreciated that bearings made according to the invention maximize load carrying capacity and do not require particular care with respect to orientation during installation.

What is claimed is:

1. In a mechanism including a shaft, a relatively rotatable member having an opening receiving the shaft, a cylindrical bearing carried by the member and journalling the shaft, and means for loading said member generally radially of the shaft; the improvement wherein said opening is elongated in a direction transverse to the direction of loading.

2. The mechanism of claim 1 wherein the exterior surface of said bearing is grooved to increase the elasticity of the bearing.

3. The mechanism of claim 1 further including a thin layer of elastomer interposed between said bearing and said opening.

4. In a mechanism including a shaft, a relatively rotatable member having an opening receiving the shaft, a cylindrical bearing carried by the member and journalling the shaft, and means for loading said member generally radially of the shaft; the improvement wherein the exterior surface of said bearing is grooved to increase the elasticity of the bearing.

5. The mechanism of claim 4 further including a thin layer of elastomer interposed between said bearing and said opening.

6. In a mechanism including a shaft, a relatively rotatable member having an opening receiving the shaft, a cylindrical bearing carried by the member and journalling the shaft, and means for loading said member generally radially of the shaft; the improvement wherein said opening is elongated in a direction transverse to the direction of loading, the exterior surface of said bearing being grooved to increase the elasticity of said bearing, and a thin layer of elastomer interposed between said bearing and said opening.

* * * * *